(12) United States Patent
Sawano et al.

(10) Patent No.: US 10,798,260 B2
(45) Date of Patent: Oct. 6, 2020

(54) IMAGE FORMING DEVICE WITH ICON DISPLAY AND SYSTEM THEREOF

(71) Applicant: SHARP KABUSHIKI KAISHA, Sakai, Osaka (JP)

(72) Inventors: Takashi Sawano, Sakai (JP); Mayuko Yoshida, Sakai (JP); Kumiko Ogino, Sakai (JP); Yasuhiro Nakai, Sakai (JP); Masao Saeda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/177,417

(22) Filed: Oct. 31, 2018

(65) Prior Publication Data
US 2019/0132460 A1 May 2, 2019

(30) Foreign Application Priority Data

Nov. 1, 2017 (JP) .................................. 2017-211496

(51) Int. Cl.
*G06F 3/12* (2006.01)
*H04N 1/00* (2006.01)

(52) U.S. Cl.
CPC ..... *H04N 1/00517* (2013.01); *H04N 1/00424* (2013.01); *H04N 1/00474* (2013.01)

(58) Field of Classification Search
CPC .......... H04N 1/00517; H04N 1/00424; H04N 1/00251; H04N 1/00474; H04N 1/4426; H04N 2201/0094; G06F 3/1243; G06F 3/1285

USPC ........................................................ 358/1.13
See application file for complete search history.

(56) References Cited

U.S. PATENT DOCUMENTS

| | | | |
|---|---|---|---|
| 8,174,727 B2 * | 5/2012 | Hoshino | H04N 1/00408 358/1.18 |
| 2007/0211263 A1 | 9/2007 | Hoshino et al. | |
| 2011/0242024 A1 * | 10/2011 | Fukumoto | H04N 1/00411 345/173 |
| 2014/0033095 A1 | 1/2014 | Koba et al. | |
| 2015/0277750 A1 * | 10/2015 | Sakaguchi | G06F 3/041 345/173 |
| 2016/0381250 A1 | 12/2016 | Hirai et al. | |
| 2017/0060505 A1 * | 3/2017 | Tamashima | G06F 3/1258 |
| 2017/0064097 A1 * | 3/2017 | Yamamoto | H03K 19/17748 |
| 2017/0308019 A1 * | 10/2017 | Nishino | B65H 1/00 |

FOREIGN PATENT DOCUMENTS

| | | |
|---|---|---|
| CN | 101604224 A | 12/2009 |
| JP | 2016-206926 A | 12/2016 |

* cited by examiner

*Primary Examiner* — Gabriel I Garcia
(74) *Attorney, Agent, or Firm* — ScienBiziP, P.C.

(57) ABSTRACT

An information processing device includes a display. A first setting screen, which is used to set a setting condition of a selected job, is displayed on the display. The first setting screen includes a plurality of setting icons used to determine a first type setting and a second type setting. The first type setting or the second type setting is assigned to be different from each other to each of the plurality of setting icons. In addition, the plurality of setting icons is disposed in a matrix shape, the first type setting is disposed to be different in a first direction, and the second type setting is disposed to be different in a second direction which is different from the first direction.

9 Claims, 8 Drawing Sheets

IMAGE FORMING DEVICE WITH ICON DISPLAY AND SYSTEM THEREOF

BACKGROUND

1. Field

The present disclosure relates to an image forming device and an image forming system, and more particularly to an image forming device and an image forming system which are capable of executing a plurality of functions.

2. Description of the Related Art

Japanese Unexamined Patent Application Publication No. 2016-206926 discloses an example according to the related art. An image forming device according to the related art includes a display, and receives a user operation through a Graphical User Interface (GUI) displayed on the display. For example, a main menu screen, which includes buttons assigned to jobs of the image forming device, such as a copy machine, a facsimile or a scanner, is displayed on the display. In a case where any one of the buttons is selected in the main menu screen, a sub menu screen, which includes content for a function corresponding to the selected button, is displayed on the display. A detailed setting is performed in the sub menu screen, and each function is performed in the image forming device.

However, in the image forming device according to the related art, setting is performed for one setting item in one setting screen, and thus there is a problem in that time is taken for performing a job setting work.

It is desirable to provide an image forming device and an image forming system, which are new.

It is further desirable to provide an image forming device and an image forming system which are capable of performing a job setting with a simple operation.

SUMMARY

According to an aspect of the disclosure, there is provided an image forming device including a display that displays a setting screen which includes a plurality of setting icons to which a first type setting and a second type setting are assigned to be different from each other for the image forming device. Each of the plurality of setting icons is disposed in a matrix shape, and is disposed such that the first type setting is disposed to be different in a first direction and the second type setting is disposed to be different in a second direction which is different from the first direction.

According to another aspect of the disclosure, there is provided an image forming system including the image forming device of the first aspect; and an information processing device that is capable of communicating with the image forming device, in which at least one of the plurality of functions is performed in such a way that the image forming device cooperates with the information processing device.

DESCRIPTION OF THE EMBODIMENTS

First Embodiment

Figure 1:
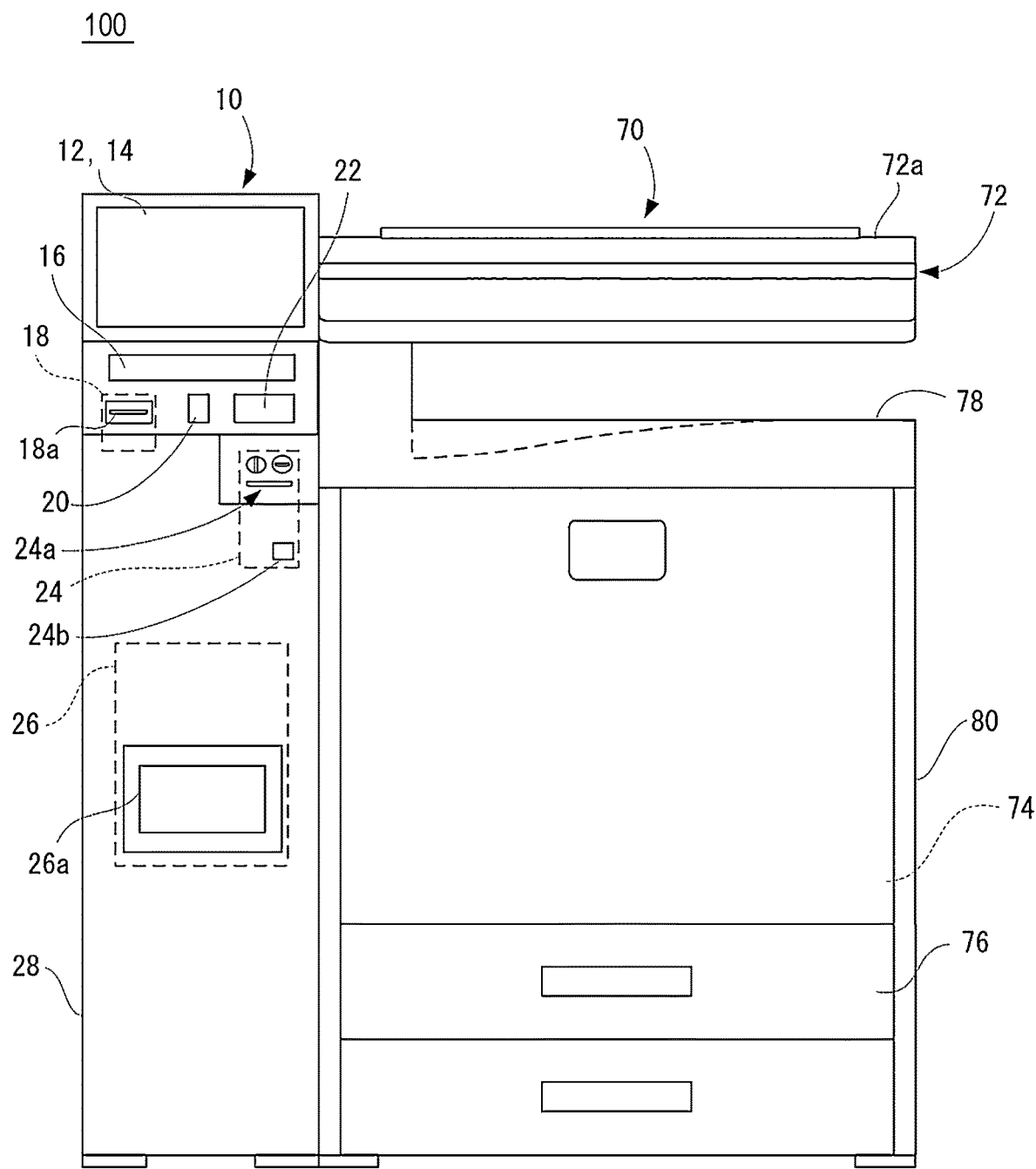
FIG. 1 is a diagram illustrating an exterior configuration of an information processing system which is an example of the disclosure.

FIG. 1 is a diagram illustrating an example of a configuration of an information processing system (corresponding to an image forming system) 100 of the disclosure. Referring to FIG. 1, the information processing system 100 according to a first embodiment of the disclosure includes an information processing device 10 and an image forming device 70.

The information processing device 10 is a Multimedia Kiosk (MMK) terminal which is installed in a store, such as a supermarket, a restaurant, or a convenience store, or a public facility such as a station, a bus terminal, an airport, a government office, or a library. The information processing device 10 provides various pieces of information or a predetermined service to a user according to a location where the information processing device 10 is disposed. In addition, although details will be described later, the information processing device 10 is capable of providing the predetermined service, such as copying, printing, scanning, or faxing, to the user in cooperation with the image forming device 70.

Meanwhile, in the specification, a front and back direction (a depth direction) of the information processing device 10 and configuration members thereof is prescribed while setting a surface which faces a location where the user stands, that is, a surface on a side where a display 14 which will be described later is provided to a forward surface (front surface), and a right and left direction (a lateral direction) of the information processing device 10 and the configuration members thereof is prescribed on the basis of a state in which the information processing device 10 is viewed from the user. The directions are the same as in the image forming device 70.

The information processing device 10 includes a device main body 28 which includes a display 14 equipped with a touch panel 12, a recording medium connection unit 16, a paper piece printer 18, a symbol reading unit 20, a near field communication unit 22, a money processing unit 24, and a photo printer 26.

The display 14 equipped with the touch panel 12 is disposed at an upper end part of the information processing device 10 (device main body 28). The touch panel 12 is a general-purpose touch panel, and it is possible to use a random type, such as an electrostatic capacity type, an electromagnetic induction type, resistive film type, or an infrared ray type, of touch panel. In the first embodiment, an electrostatic capacity type touch panel is used as the touch panel 12, and the touch panel 12 is provided on a display surface of the display 14. However, a touch panel display, in which the touch panel 12 and the display 14 are integrally formed, may be used. In addition, for example, it is possible to use an LCD, an Electro-Luminescence (EL) display or the like as the display 14.

The recording medium connection unit 16 includes a mounting unit (for example, a drive and a memory slot) used to mount various recording media. The various recording media includes an optical disk (for example, a CD-R, a DVD-R, or a BD-R), a flash memory (for example, a USB memory, an SD memory card, or a memory stick), and the like. However, the optical disk is mounted on the drive. In addition, the flash memory is mounted on the memory slot.

The paper piece printer 18 includes, for example, a thermal printer (thermosensitive printer) or a dot impact printer, and issues a paper piece, such as a receipt, a journal, or a coupon, on which an image is printed. Specifically, the paper piece printer 18 prints various strings, images, code patterns (a barcode and the like), or the like on a roll paper, and discharges a completely printed paper piece from a paper ejection unit 18a.

The symbol reading unit 20 includes, for example, a laser scanner, a camera, or the like, and is capable of reading a symbol which is attached to a product, a card, a receipt, or the like, a symbol which is displayed on a screen of the user terminal (mobile terminal), or the like. The symbol, which is allowed to be read by the symbol reading unit 20, includes a barcode (one-dimensional barcode) or a 2-dimensional code (for example, a QR code (registered trade mark), a micro QR code, a Data MATRIX, a MaxiCODE, a VeriCODE, or the like).

For example, the near field communication unit 22 wirelessly performs contactless data communication with a communication target, such as an IC card (an identification card, a membership card, an employee card, or the like) or a user terminal, in conformity to a communication standard (so-called Near Field Communication (NFC)), such as ISO/IEC18092, or the Like. A communicable distance of the near field communication unit 22 is approximately a few cm to a few m. The near field communication unit 22 transmits a signal (read command), which is used to instruct to read data stored in the communication target, with respect to the communication target. The communication target transmits desired data to the near field communication unit 2 in response to the read command. In addition, the near field communication unit 22 transmits data (write data) to be written in the communication target and a signal (write command) which is used to instruct to write the data. The communication target writes (stores) the received write data in a storage unit of the communication target according to the write command.

The money processing unit 24 includes a money insertion part 24a and a coin return opening 24b. The money insertion part 24a includes a coin insertion opening, a paper money insertion opening, a chance return lever, and the like, and is disposed below the near field communication unit 22. A coin inserted from the coin insertion opening and paper money inserted from the paper money insertion opening are respectively classified for respective types and are accommodated in predetermined money storage sections (not illustrated in the drawing). The money storage sections include a coin storage section and a paper money storage section. In a case where the coin or the paper money is inserted, the amount of inserted money is calculated according to the type and the number of coins accommodated in the coin storage section and the type and the number of paper money accommodated in the paper money storage section. In a case where the predetermined service or the like is performed in the information processing device 10, costs according to content of the service are subtracted from the amount of inserted money, and a balance of the amount of inserted money is calculated. In addition, in a case where the change return lever is operated, a coin or paper money is returned according to the balance of the amount of inserted money. Meanwhile, the coin is returned from the coin return opening 24b provided below the money insertion part 24a, and the paper money is returned from the paper money insertion opening.

The photo printer 26 is, for example, a sublimation type printer or an ink let printer, and prints an image on a photo paper. A photograph, which is printed by the photo printer 26, is discharged to a discharge unit 26a. Meanwhile, image data stored in the recording medium connected to the recording medium connection unit 16, image data transmitted from an external computer, or the like is used as image data used to form the image on the paper. In addition, a size of the photograph to be printed by the photo printer 26 includes an L size, a postcard size, a 2L size, or the like.

As described above, since the information processing device 10 includes the paper piece printer 18 and the photo printer 26 (which includes a printer function), the information processing device 10 is one type of the image forming device.

Figure 2:
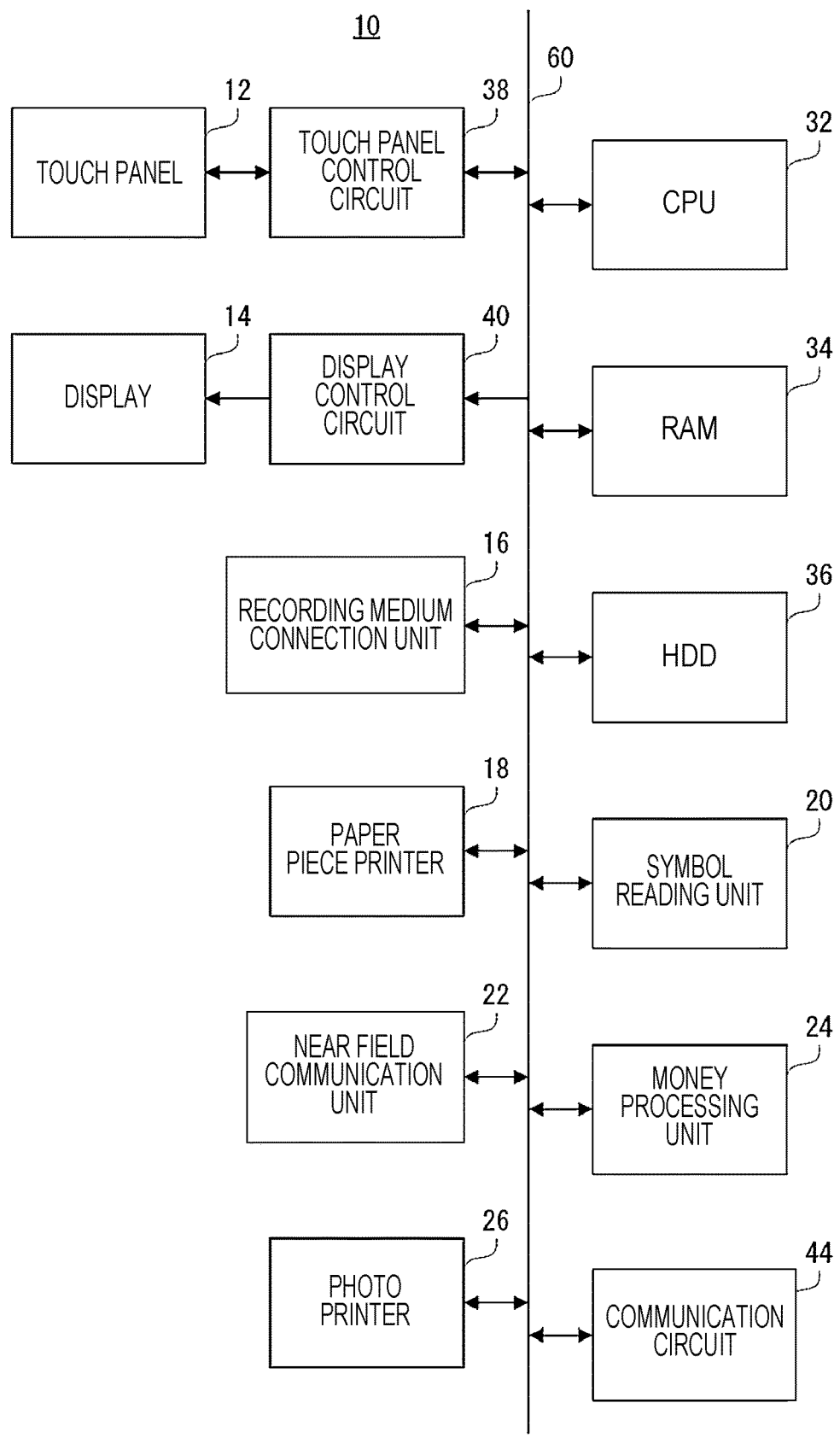
FIG. 2 is a block diagram illustrating an electrical configuration of an information processing device illustrated in FIG. 1.

FIG. 2 is a block diagram illustrating an electrical configuration of the information processing device 10 illustrated in FIG. 1. Referring to FIG. 2, the information processing device 10 includes a CPU 32. A RAM 34, a ROM 36, a touch panel control circuit 38, a display control circuit 40, a recording medium connection unit 16, a paper piece printer 18, a symbol reading unit 20, a near field communication unit 22, a money processing unit 24, a photo printer 26, and a communication circuit 44 are connected to the CPU 32 through a bus 60. In addition, the touch panel 12 is connected to the touch panel control circuit 38, and the display 14 is connected to the display control circuit 40.

The CPU 32 performs overall control on the information processing device 10. The RAM 34 is used as a work area and a buffer area of the CPU 32. The ROM 36 stores a startup program of the information processing device 10 and default values for various pieces of information.

The touch panel control circuit 38 applies a desired voltage or the like to the touch panel 12, detects a touch operation (touch input) within an available touch range of the touch panel 12, and outputs touch coordinate data, which indicates a touch input location, to the CPU 32.

The display control circuit 40 includes a GPU, a VRAM, or the like. The GPU generates display image data, which is used to display various screens on the display 14, in the VRAM using image generation data stored in the RAM 34 under an instruction of the CPU 32, and outputs the generated display image data to the display 14.

The communication circuit 44 is a communication circuit used to connect a network such as the Internet. The communication circuit 44 is a wired communication circuit or a wireless communication circuit, and communicates with an external computer (external terminal), such as a server, according to the instruction from the CPU 32 via the network. Meanwhile, the communication circuit 44 is capable of directly communicating with the image forming device 70, a user terminal, or the like in a wired or wireless manner (for example, using an infrared ray method, a WiFi (registered trade mark) method, or a Bluetooth (registered trade mark) method) without passing via the network.

Meanwhile, the electrical configuration of the information processing device 10 illustrated in FIG. 2 is only an example, and the disclosure is not limited thereto.

Returning to FIG. 1, the image forming device 70 is a Multifunction Peripheral (MFP) which includes a copy function, a printer function, a scanner function, a facsimile function, and the like.

The image forming device 70 includes a device main body 80 which includes an image reading unit 72, an image forming unit 74, a paper feeding unit 76, and a paper discharge tray 78. Meanwhile, the image forming device 70 is installed in a vicinity of the information processing device 10. For example, the image forming device 70 is provided to be adjacent to a right side of the information processing device 10.

The image reading unit 72 includes a document pedestal which is formed of a transparent material, and is built in the device main body 80. A document pressing cover 72a is attached at an upper part of the document pedestal to be openable through a hinge or the like.

In addition, the image reading unit 72 includes a light source, a plurality of mirrors, an image formation lens, a line sensor, and the like. The image reading unit 72 exposes a document surface using the light source, and guides reflective light reflected from the document surface to the image formation lens through the plurality of mirrors. Furthermore, the image formation lens causes the reflective light to form the image on a light reception element of the line sensor. In the line sensor, brightness or chromaticity of the reflective light which forms the image on the light reception element is detected, and image data to be read is generated based on the image of the document surface. A Charge Coupled Device (CCD), a Contact Image Sensor (CIS), or the like is used as the line sensor.

The image forming unit 74 is built in the device main body 80, and is provided below the image reading unit 72. The image forming unit 74 includes a photosensitive drum, a charging section, an exposure section, a developing section, a transfer section, a fixing section, and the like. The image forming unit 74 forms an image on the recording medium (paper), which is transported from the paper feeding unit 76 or the like, using an electronic photograph method, and discharges the paper, on which the image is completely formed, to the paper discharge tray provided between the image reading unit 72 and the image forming unit 74. Meanwhile, image data which is read using the image reading unit 72, image data which is transmitted from the information processing device 10, image data which is transmitted from the external computer, or the like is used as the image data which is used to form the image on the paper. In addition, the recording medium is not limited to the paper, and a sheet other than the paper, such as an OHP film, may be used.

Figure 3:
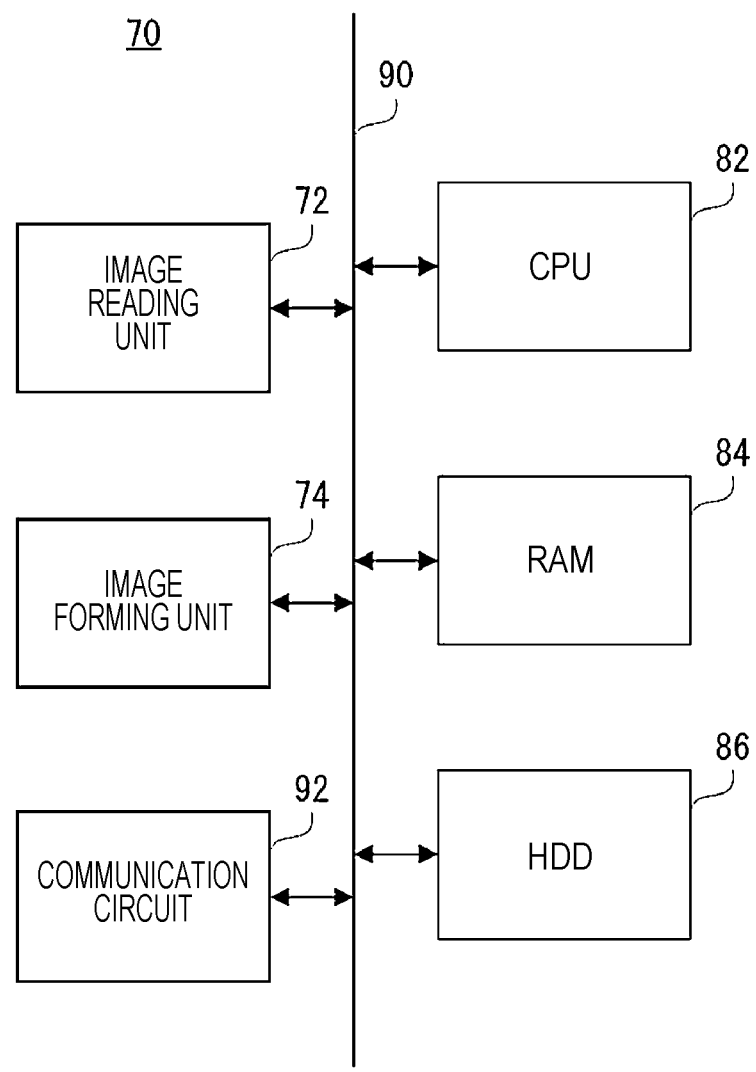
FIG. 3 is a block diagram illustrating an electrical configuration of an image forming device illustrated in FIG. 1.

FIG. 3 is a block diagram illustrating an electrical configuration of the image forming device 70 illustrated in FIG. 1. Referring to FIG. 3, the image forming device 70 includes a CPU 82. A RAM 84, an HDD 86, the image reading unit 72, the image forming unit 74, and a communication circuit 92 are connected to the CPU 82 through a bus 90.

The CPU 82 performs overall control on the image forming device 70. The RAM 84 is used as a work area and a buffer area of the CPU 82.

The HDD 86 is a main storage unit of the image forming device 70, and appropriately stores a control program, which is used for the CPU 82 to control operations of respective parts of the image forming device 70, the display image data for the various screens, and the like. However, instead of the HDD 86 or together with the HDD 86, another non-volatile memory, such as an SSD, a flash memory, or an EEPROM, may be used.

The communication circuit 92 is a communication circuit used to connect the network such as the Internet. The communication circuit 92 is a wired communication circuit or a wireless communication circuit, and communicates with the external computer, such as the server, via the network according to an instruction from the CPU 82. Meanwhile, the communication circuit 92 is capable of directly communicating with the information processing device 10 in the wired or wireless manner without passing via the network.

Meanwhile, the electrical configuration of the image forming device 70 illustrated in FIG. 3 is only an example, and it is not demanded to be limited thereto.

In the information processing system 100 which have the above-described configuration, an operation screen is displayed on the display 14 of the information processing device 10, and a user operation is received according to the touch input performed on the touch panel 12. For example, a home screen, which includes a plurality of icons respectively assigned to a plurality of functions (jobs) that are executable in the information processing system 100, is displayed on the display 14. In a case where any one of the icons is selected through the user operation, a plurality of setting screens, which are used to set a setting condition of a selected job, are sequentially displayed on the display 14. In the setting screens, detailed settings are performed and each job is performed in the information processing device 10 or the image forming device 70.

Meanwhile, in an information processing device according to the related art, setting is performed for one setting item in one setting screen, and thus there is a problem in that time is taken for a job setting work.

Here, in the first embodiment, a setting screen, which includes a plurality of setting icons used to set (determine) a first type setting and a second type setting that are included in a job setting condition, is displayed on the display 14.

Figure 4:
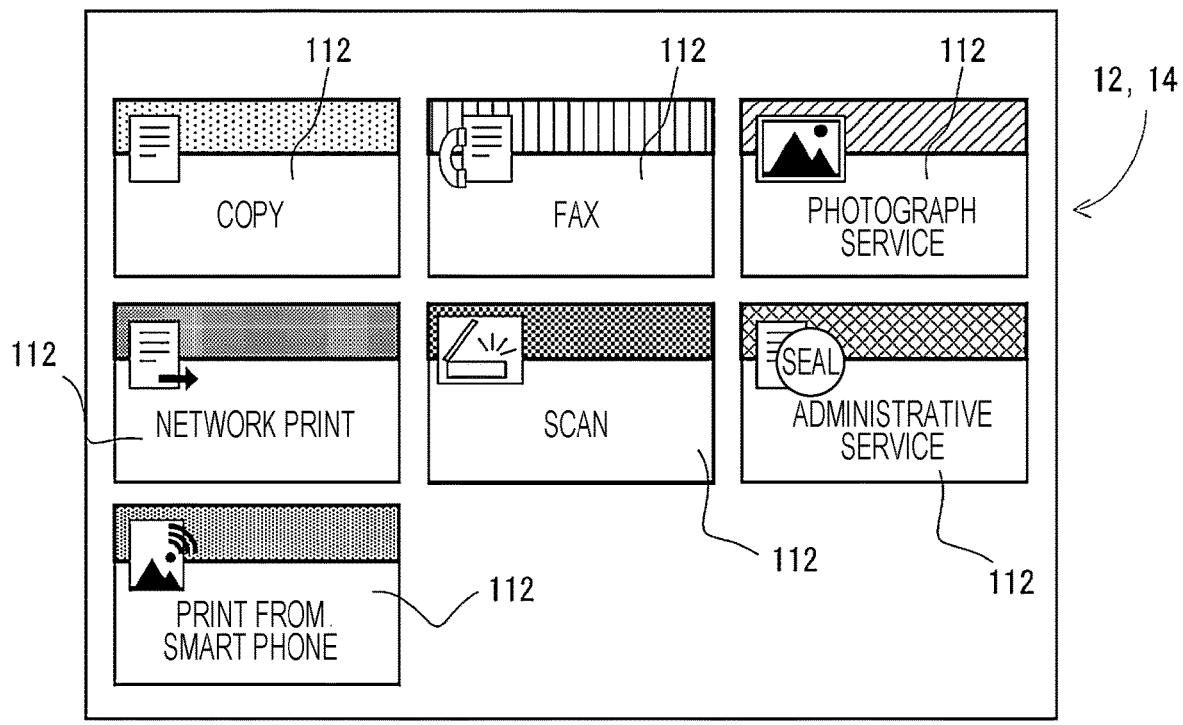
FIG. 4 is a diagram illustrating an example of a home screen.
Figure 5:
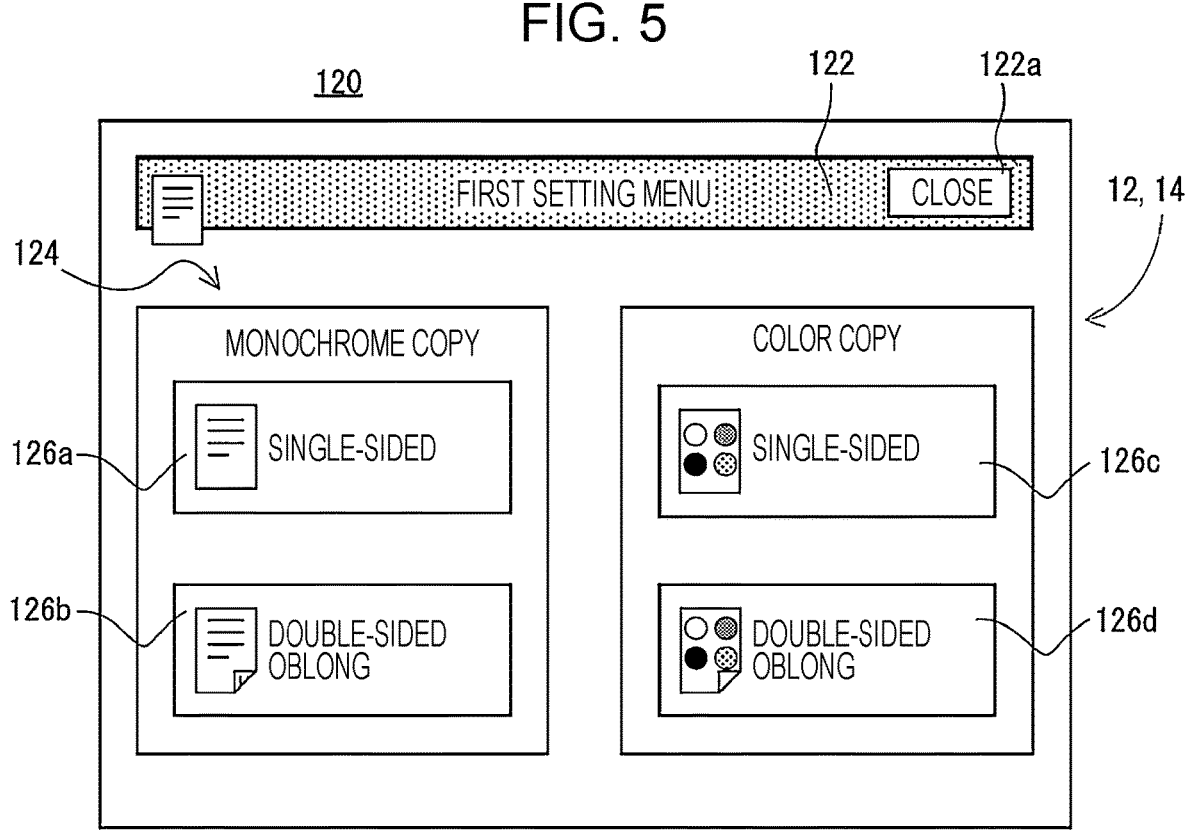
FIG. 5 is a diagram illustrating an example of a first setting screen.
Figure 6:
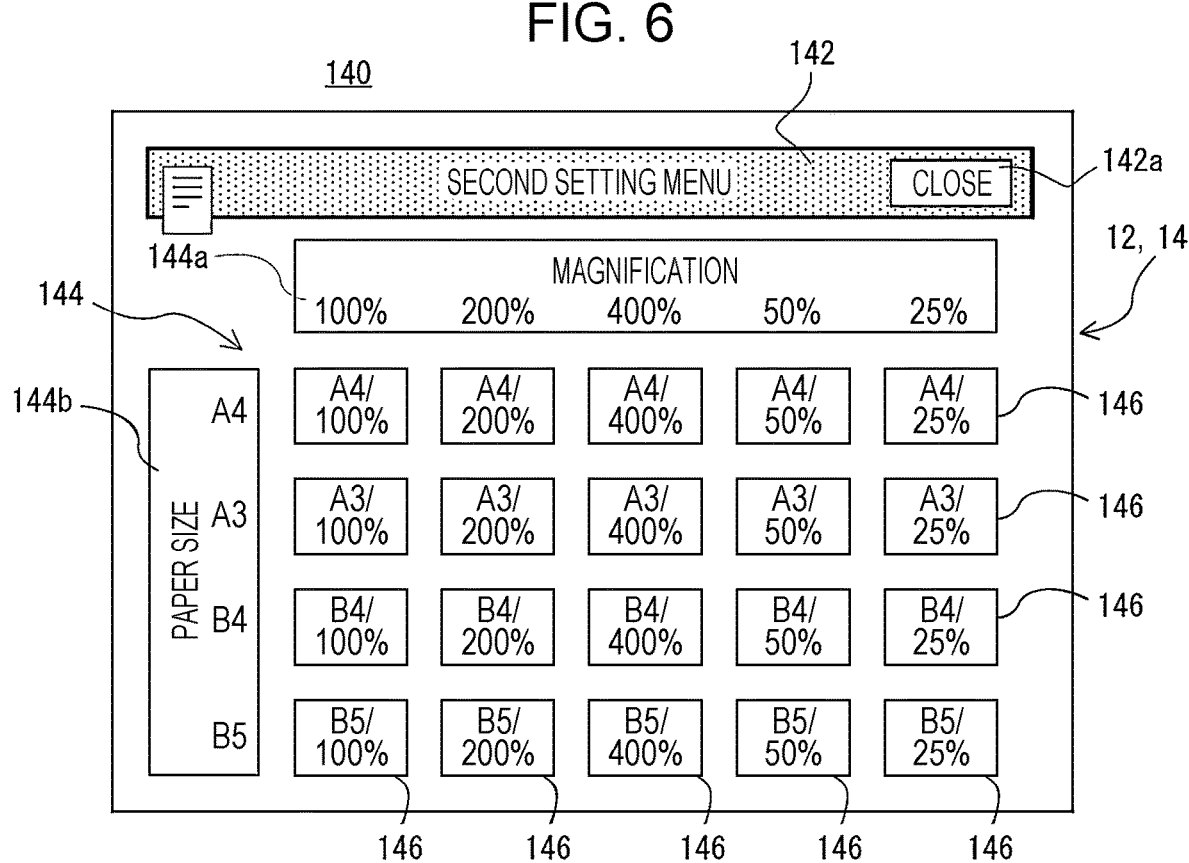
FIG. 6 is a diagram illustrating an example of a second setting screen.
Figure 7:
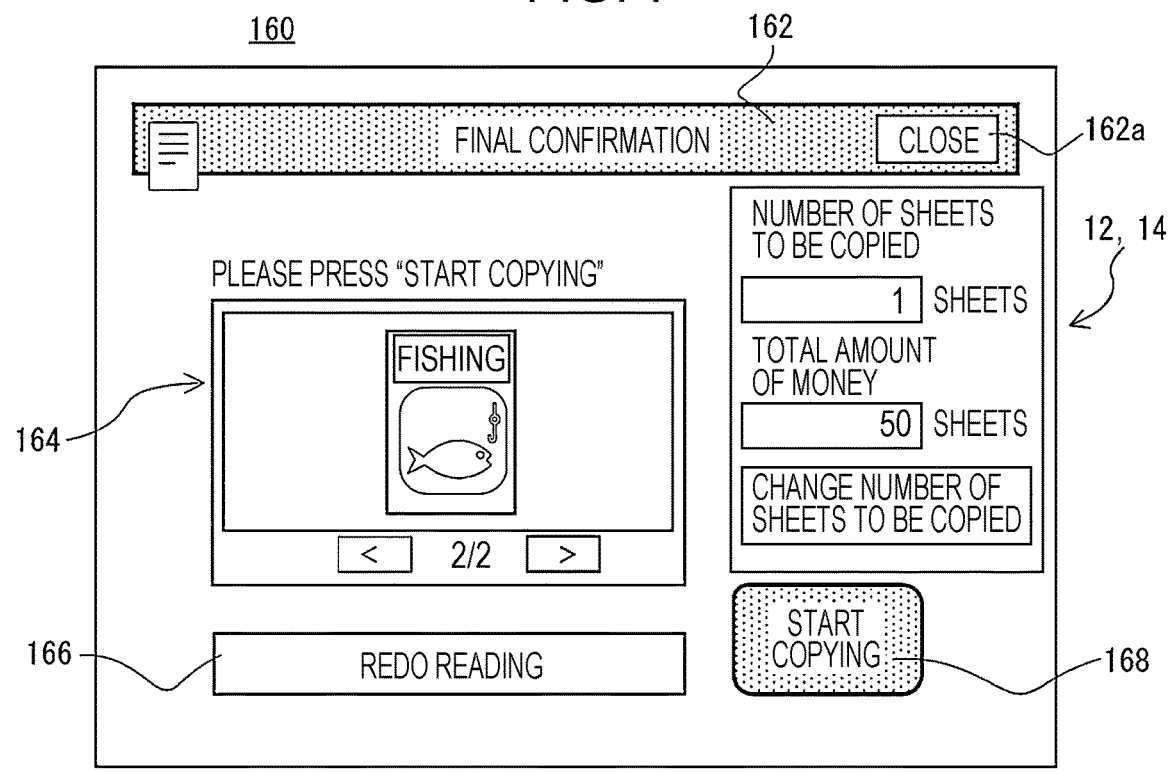
FIG. 7 is a diagram illustrating an example of a confirmation screen.

Hereinafter, an example of an operation of the information processing system 100 will be described with reference to FIGS. 4 to 7. FIG. 4 is a diagram illustrating an example of a home screen 110. FIG. 5 is a diagram illustrating an example of a first setting screen 120. FIG. 6 is a diagram illustrating an example of a second setting screen 140. FIG. 7 is a diagram illustrating an example of a confirmation screen 160.

In a case where a main power supply for the information processing device 10 and the image forming device 70 is turned on and the information processing device 10 and the image forming device 70 are in a waiting state in which it is possible to perform respective functions, the home screen 110 as illustrated in FIG. 4 is displayed on the display 14 of the information processing device 10. The home screen 110 is one of home screens (operation screens) used to select the various jobs. However, in the first embodiment, the job indicates copy, scan, print, transmission of the facsimile, or the like. In the home screen 110, a plurality of icons 112 and pieces of identification information 114, which are used to select respective jobs, are displayed.

Each of the plurality of icons 112 is an image surrounded by an approximately rectangular frame, and function as a software key. A jobs, such as "copy", "facsimile", "photograph service", "network print", "scan", "administrative service", or "print from a smart phone" is assigned to each of the plurality of icons 112. Each of the plurality of icons 112 includes an area (name display area) which displays a name. The name display area is an area used to display a name of a function corresponding to the icon 112, and is provided at a lower side part of the icon 112 from a center in a vertical direction.

In a case where any of the icons 112 included in the home screen 110 is touched (selected), the plurality of setting screens, which are used to set the job assigned to the icon 112, are sequentially displayed on the display 14. For example, in a case where the icon 112, to which the copy job is assigned, is touched, the first setting screen (first copy setting screen) 120, as illustrated in FIG. 5, is displayed as an initial setting screen used to perform setting for the copy job.

The first setting screen 120 includes a tab 122 and a setting area 124. The tab 122 is disposed in a belt shape at an upper part of the first setting screen 120. In addition, a close icon 122*a* used to close the first setting screen 120 is displayed in the tab 122. In a case where the close icon 122*a* is touched, the first setting screen 120 is closed (non-displayed) and the home screen 110 is displayed on the display 14. Close icons 142*a* and 162*a*, which will be described later, are similar to the close icon 122*a*.

The setting area 124 is an area used to set a partial setting condition of the copy job. In the setting area 124, two types of settings (a monochrome copy/color copy setting or a single-sided copy/double-sided copy setting) are determined. In the setting area 124, a plurality of setting icons 126 are displayed. Specifically, in the setting area 124, four setting icons 126*a* to 126*d* are displayed.

The monochrome copy/color copy setting and the single-sided copy/double-sided copy setting are assigned to each of the setting icons 126*a* to 126*d*. In addition, the monochrome copy/color copy setting and the single-sided copy/double-sided copy setting are assigned to each of the setting icons 126*a* to 126*d* so as to be different from each other. Meanwhile, two types exist for each of the monochrome copy/color copy setting and the single-sided copy/double-sided copy setting. Therefore, four types exist for a combination of the two types of settings. Any of the four types of settings is assigned to each of the setting icons 126*a* to 126*d*.

In addition, the setting icons 126*a* to 126*d* are disposed in a matrix shape, the monochrome copy/color copy setting (the first type setting) is disposed to be different in a lateral direction (corresponding to a first direction), and the single-sided copy/double-sided copy setting (the second type setting) is disposed to be different in a vertical direction (corresponding to a second direction).

Furthermore, a figure (mark image), a string, or the like, which is related to content of the monochrome copy/color copy setting or the single-sided copy/double-sided copy setting, is displayed in each of the setting icons 126*a* to 126*d*.

Therefore, in a case where any of the setting icons 126*a* to 126*d* is touched, it is possible to determine two types of settings (the monochrome copy/color copy setting and the single-sided copy/double-sided copy setting), which are included in a copy job setting condition, at one time. That is, it is possible for the user to determine the two types of settings with one operation (touch) at one time.

For example, in a case where the setting icon 126*d*, to which the double-sided copy setting and the color copy setting are assigned, is touched, the monochrome copy/color copy setting is determined to be "color copy" as the copy job setting condition, and the single-sided copy/double-sided copy setting is determined to be "double-sided copy". In a case where a copy on setting, which is set in the first setting screen 120, is determined, the display of the display 14 switches to a subsequent setting screen.

For example, as illustrated in FIG. 6, a second setting screen 140 is displayed on the display 14 as the subsequent setting screen of the first setting screen 120.

The second setting screen 140 includes a tab 142 and a setting area 144. The tab 142 is disposed in a belt shape at an upper part of the second setting screen 140, similar to the above-described tab 122. In addition, the close icon 142*a* is displayed in the tab 142.

The setting area 144 is an area used to set a partial setting condition of the copy job. In the setting area 144, two types of settings (a paper size setting and a copy magnification setting) are determined. For example, twenty icons 146 are displayed in the setting area 144.

In addition, in the setting area 144, a first display area 144*a*, which is disposed to extend in the lateral direction (right and left directions) at an upper end part of the setting area 144, and a second display area 144*b*, which is disposed to extend in the vertical direction (up and down directions) at a left end part of the setting area 144, are provided.

in the first display area 144*a*, the copy magnification settings (first type setting), which are different from each other, are assigned to a plurality of respective locations (first setting locations) in the lateral direction. For example, in the example illustrated in FIG. 6, the copy magnification settings (setting values), which are different from each other, are assigned to the respective five first setting locations. Specifically, as the copy magnification settings, "100%", "200%", "400%", "50%"and "25%" are sequentially assigned from the first setting location on a leftmost side.

In addition, in the second display area 144*b*, paper size settings (second type setting), which are different from each other, are assigned to a plurality of respective locations (second setting locations) in the vertical direction. For example, in the example illustrated in FIG. 6, the paper size settings, which are different from each other, are assigned to the respective four second setting locations. Specifically, as the paper size settings, "A4", "A3", "B4", and "B5" are sequentially assigned from the second setting location on an uppermost side.

The paper size settings and the copy magnification settings are assigned to the respective twenty icons 146 to be different from each other.

In addition, the twenty icons 146 are disposed in a matrix shape, the paper size settings are disposed to be different in the lateral direction, and the copy magnification settings are disposed to be different in the vertical direction.

However, each of the twenty icons 146 is disposed in a location corresponding to any of the plurality of first setting locations in the vertical direction and is disposed in a location corresponding to any of the plurality of second setting locations in the lateral direction.

In addition, the copy magnification setting, which is assigned to the relevant first setting location in the vertical direction, and the paper size setting, which is assigned to the relevant second setting location in the lateral direction, are assigned to each of the twenty icons 146. That is, the copy magnification setting, which is assigned to the first setting location, and the paper size setting, which is assigned to the second setting location, are assigned to the icon 146 which is disposed in a location where a vertical axis having the first setting location crosses a horizontal axis having the second setting location.

Furthermore, in each of the twenty icons 146, a string or the like, which is relevant to content of the paper size setting or the copy magnification setting that is assigned to each of the icons, is displayed.

Furthermore, in a case where any of the twenty icons 146, which are displayed in the setting area 144, is touched, settings for the two types of settings (the paper size setting or the copy magnification setting), which are included in the copy job setting condition, are determined.

For example, in a case where an icon 146 (an icon at a top-left corner illustrated in FIG. 6), to which a setting of A4 size/100% is assigned, is touched, the paper size setting is determined to be "A4" as the, copy job setting condition, and the copy magnification setting is determined to be "100%". In a case where the copy job setting, which is set in the second setting screen 140, is determined, the display of the display 14 switches to a subsequent setting screen.

As described above, the plurality of setting screens for the copy job are sequentially displayed on the display 14 until the copy job setting is completed, and the copy job setting is determined according to the user operation. Furthermore, in a case where the copy job setting is completed and a document is read by the image reading unit 72, the confirmation screen 160 as illustrated in FIG. 7 is displayed on the display 14.

The confirmation screen 160 is, for example, a screen used to urge the user to confirm whether or not to perform the copy job, and includes a tab 162, a preview area 164, a redo icon 166, a start icon 168, and the like. In addition, although detailed description will not be performed, the confirmation screen 160 is also provided with an icon used to change the number of sheets to be copied, a display area used to display a charge, and the like.

The tab 162 is disposed in a belt shape at an upper part of the confirmation screen 160, similar to the above-described tab 122. In addition, the close icon 162a is displayed in the tab 162.

In the preview area 164, an image (preview image) of the document, which is read by the image reading unit 72, is displayed. However, the preview image is generated according to the copy job setting determined in the above-described setting screens (for example, the first setting screen 120, the second setting screen 140, and the like). For example, in a case where the monochrome copy/color copy setting is "monochrome copy", a preview image, in which a color conversion into a monochromatic gray scale image is performed on a color image, is generated even in a case where the read image is a color image. Therefore, it is possible for the user to confirm a result of a printed matter.

A function used to instruct to redo reading of the document is assigned to the redo icon 166. In a case where the redo icon 166 is touched, the document is read by the image reading unit 72.

A function used to instruct to perform the copy job is assigned to the start icon 168. In a case where the start icon 168 is touched, the copy job is performed according to the copy job setting.

In the first embodiment, the setting screens, which each includes the plurality of icons to which the first type setting and the second type setting that are included in the job setting condition are assigned to be different from each other, are displayed on the display 14. Therefore, it is possible to determine the two types of settings included in the copy job setting condition at one time. Therefore, it is possible to perform the job setting with a simple operation.

In addition, according to the first embodiment, the plurality of icons are disposed in a matrix shape, the first type setting is disposed to be different along the lateral direction (corresponding to the first direction), and the second type setting is disposed to be different along the vertical direction (corresponding to the second direction). Therefore, it is easy to visually recognize the settings assigned to the icon 146.

Furthermore, in the first embodiment, the first type setting assigned to the first setting location and the second type setting assigned to the second setting location are assigned to the icon 146 disposed in the location where the vertical axis having the first setting location crosses the horizontal axis having the second setting location. Therefore, it is easy to visually recognize the settings assigned to the icon 146.

Second Embodiment

An information processing device 10 according to a second embodiment is similar to the first embodiment other than a fact that display aspects of the plurality of setting icons which are displayed on the setting screen are changed according to a use frequency. Therefore, content which is different from the first embodiment will be described and duplicated description will not be repeated.

Figure 8:
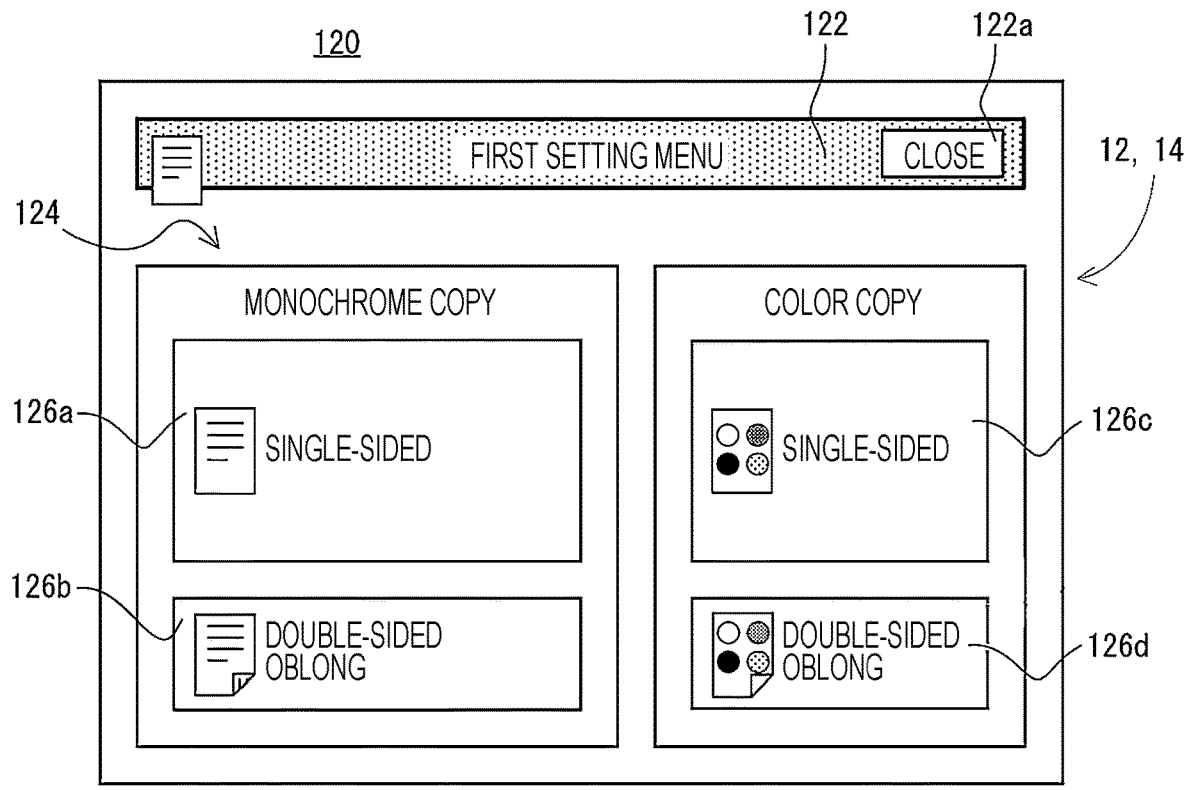
FIG. 8 is a diagram illustrating an example of a first setting screen according to a second embodiment.

FIG. 8 is a diagram illustrating an example of a first setting screen 120 according to the second embodiment. In the second embodiment, each of a plurality of setting icons displayed on the setting screen is disposed in a location according to the use frequency. Specifically, a setting icon, of which a high use frequency is estimated, is disposed on a left side in the lateral direction and is disposed on an upper side in the vertical direction. A reason for this is that it is considered that the left side in the lateral direction and the upper side in the vertical direction are relatively easy to attract attention and easy to be recognized. Therefore, the setting icon, of which the high use frequency is estimated, is displayed at a top-left corner of the setting screen (setting area) which is considered to be easiest to attract attention and easy to be recognized.

For example, in the information processing system 100 disposed in the public facility, there are many cases in which the monochrome copy/color copy setting is set to the "monochrome copy" and the single-sided copy/double-sided copy setting is set to the "single-sided" as the setting condition in the copy job. Therefore, in the first setting screen 120, it is estimated that the use frequency of the setting icon 126a, of which the monochrome copy/color copy setting is the "monochrome copy" and the single-sided copy/double-sided copy setting is assigned to the "single-sided copy", is high.

Therefore, as illustrated in FIG. 8, in the first setting screen 120, the setting icon 126a, of which the high use frequency is estimated, is disposed on the leftmost side in the lateral direction, and is disposed on the uppermost side in the vertical direction. That is, the setting icon 126a is disposed at the top-left corner of the first setting screen 120 (setting area 124).

In contrast, in the information processing system 100 which is disposed in the public facility, there is a few case where the monochrome copy/color copy setting is set to the "color copy" and the single-sided copy/double-sided copy setting is set, to the "double-sided" as the setting condition in the copy job. Therefore, it is estimated that the use frequency of the setting icon 126d is low. Therefore, in the first setting screen 120, the setting icon 126d, of which a low use frequency is estimated, is disposed on a rightmost side in the lateral direction and is disposed on a lowermost side in the vertical direction. That is, the setting icon 126d is disposed at a lower-right corner of the first setting screen 120 (setting area 124).

In addition, in the second embodiment, each of the plurality of setting icons, which are displayed on the setting screen, is displayed in a size according to the use frequency. Specifically, the setting icon, of which the high use frequency is estimated, is displayed to be larger than other setting icons, and a setting icon, of which the low use frequency is estimated, is displayed to be smaller than other setting icons.

For example, in the first setting screen 120, the setting icon 126a, of which the high use frequency is estimated, is displayed to be larger than other setting icons 126b to 126d. In contrast, the setting icon 126d, of which the low use frequency is estimated, is displayed to be smaller than other setting icons 126a to 126c.

In addition, the setting icon 126b and the setting icon 126c, of which a normal use frequency (medium degree) is estimated, are displayed to be smaller than the setting icon 126a, of which the high use frequency is estimated, and are displayed to be larger than the setting icon 126d of which the low use frequency is estimated. Therefore, it may be said that each of the plurality of setting icons, which are displayed on the setting screen, is gradually displayed to be larger (smaller) in order of high use frequency. In addition, it may be said that each of the plurality of setting icons, which are displayed on the setting screen, is displayed in an aspect which is easy to attract attention in order of high use frequency.

However, each of the plurality of setting icons, which are displayed on the setting screen, has a size in the lateral direction (first direction), which is set to a size corresponding to a next setting icon in the vertical direction (second direction), and has a size in the vertical direction which is set to a size corresponding to a next setting icon in the lateral direction. For example, in the example illustrated in FIG. 8, the setting icon 126a has a size in the lateral direction, which corresponds to a size of the lateral direction of a next setting icon 126b in the vertical direction, and has a size in the vertical direction, which corresponds to a size of the vertical direction of a next setting icon 126c. The size is similar to the other setting icons 126b to 126d.

In addition, the figure, the string, or the like (hereinafter, referred to as "string or the like"), which is displayed in each of the setting icons, is displayed in a size according to the use frequency. Specifically, the string or the like, which is displayed in each of the setting icons, is displayed in a size in accordance with the setting icon. For example, the string or the like displayed in the setting icon, of which the high use frequency is estimated, is displayed to be larger than the string or the like displayed in other setting icons. In contrast, the string or the like displayed in the setting icon, of which the low use frequency is estimated, is displayed to be smaller than strings or the like displayed in other setting icons.

According to the second embodiment, the plurality of setting icons, which are displayed on the setting screen, are disposed in locations according to the use frequencies. Therefore, it is easy to recognize each of the plurality of setting icons. In addition, the setting icon, of which the use frequency is high, is disposed in a location which relatively easily attracts attention. Therefore, it is easy to recognize the setting icon of which the use frequency is high.

In addition, according to the second embodiment, the plurality of setting icons, which are displayed on the setting screen, are displayed in sizes according to the use frequencies. Therefore, it is easy to recognize each of the plurality of setting icons. In addition, the setting icon, of which the use frequency is high, is displayed to be larger than other setting icons. Therefore, it is easy to recognize the setting icon of which the use frequency is high.

Meanwhile, in the second embodiment, the first setting screen 120 is described as an example. However, even in another setting screen, such as the second setting screen 140 described in the first embodiment, it is possible to change display aspects of the plurality of setting icons according to the use frequencies.

Third Embodiment

An information processing device 10 according to a third embodiment is similar to the first embodiment other than a fact that the setting icons, of which the use frequency is low, are non-displayed. Therefore, content which is different from the first embodiment will be described and duplicated description will not be repeated.

Figure 9:
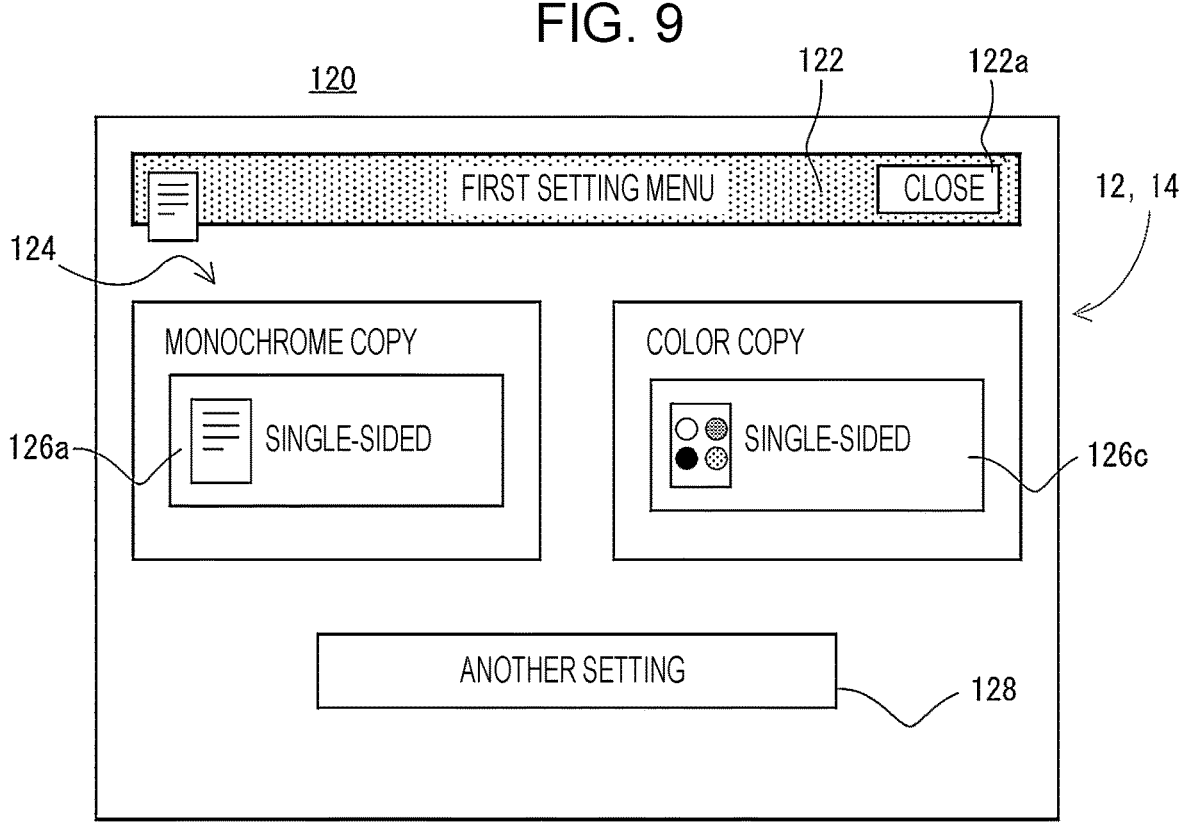
FIG. 9 is a diagram illustrating an example of a first setting screen according to a third embodiment.
Figure 10:
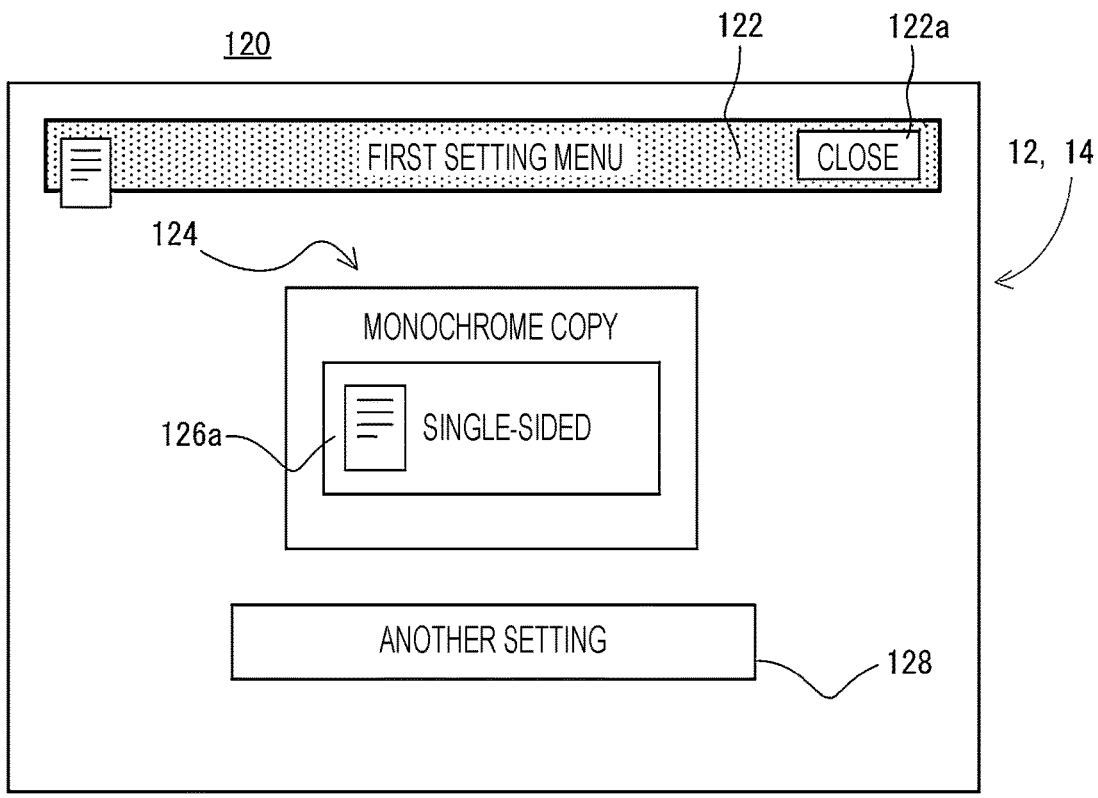
FIG. 10 is a diagram illustrating another example of the first setting screen according to the third embodiment.

FIG. 9 is a diagram illustrating an example of a first setting screen 120 according to the third embodiment. FIG. 10 is a diagram illustrating another example of the first setting screen 120 according to the third embodiment.

In the third embodiment, among the plurality of setting icons displayed on the setting screen, the setting icons, of which the use frequency is low, are non-displayed. There is a small number of cases where the single-sided copy/double-sided copy setting is set to the "double-sided copy" as the setting condition in the copy job. Therefore, among the four setting icons 126a to 126d which are included in the first setting screen 120 as illustrated in FIG. 5, it is estimated that the use frequency is low in the setting icon 126b and the setting icon 126d of which the single-sided copy/double-sided copy setting is set to the "double-sided copy". Accordingly, as illustrated in FIG. 9, the setting icon 126b and the setting icon 126d, of which the use frequency is low, are non-displayed and only the setting icon 126a and the setting icon 126c, of which the use frequency is high (the single-sided copy/double-sided copy setting is set to the "single-sided"), are displayed on the first setting screen 120 according to the third embodiment.

Meanwhile, in a display example illustrated in FIG. 9, display/non-display of the setting icon is determined according to the single-sided copy, double-sided copy setting. However, it is not demanded to be limited thereto. For example, a setting icon, of which the use frequency is lower than an average, may be non-displayed among the setting icons included in the setting screen or only one setting icon of which the use frequency is the highest, may be displayed and all the other setting icons may be non-displayed, as illustrated in FIG. 10.

However, in a case where the non-displayed setting icons exist, a display icon used to display the non-displayed setting icons is provided in the setting screen. For example, as illustrated in FIGS. 9 and 10, in the first setting screen 120 according to the third embodiment, display icon 128 is provided. In a case where the display icon 128 is touched, the non-displayed setting icons are displayed. For example, in a case where the display icon 128 is touched in the first setting screen 120 in a state in which the setting icon 126b and the setting icon 126d are non-displayed, the screen switches to the first setting screen 120, of which four setting icons 126a to 126d are displayed, as illustrated in FIG. 5.

According to the third embodiment, the setting icons, of which the use frequency is low, are non-displayed. Therefore, it is possible for a majority of users to select only the setting icon, of which the use frequency is high, without doubt, and it is possible to prevent an incorrect operation.

In addition, according to the third embodiment, in the case where the non-displayed setting icons exist, the display icon used to display the non-displayed setting icons in the setting screen is provided. Therefore, it is possible for the user who desires to select the non-displayed setting icons to select the display icon and to display desired icons.

Fourth Embodiment

An information processing device 10 according to a fourth embodiment is the same as in the first embodiment other than a fact that image parameters of the plurality of setting icons displayed on the setting screen are gradually set according to the use frequencies. Therefore, content which is different from the first embodiment will be described and duplicated description will not be repeated.

In the fourth embodiment, an image parameter is set to each of the plurality of setting icons, which are displayed on the setting screen, according to the use frequency. Meanwhile, the image parameter includes at least one of brightness, contrast, or a chroma.

Figure 11:
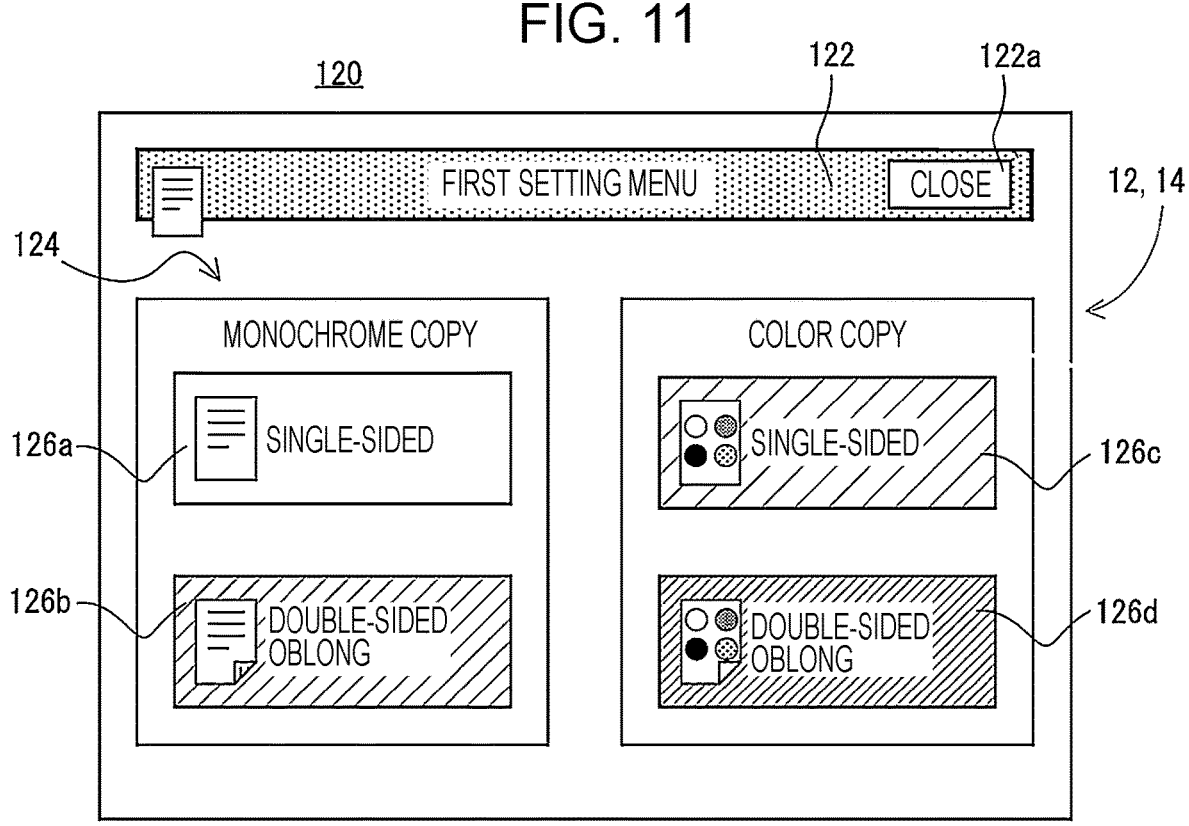
FIG. 11 is a diagram illustrating an example of a first setting screen according to a fourth embodiment.

FIG. 11 is a diagram illustrating an example of a first setting screen 120 according to the fourth embodiment. As illustrated in FIG. 11, four setting icons 126a to 126d are displayed on the first setting screen 120 according to the fourth embodiment. Here, the use frequency is high in order of the setting icon 126a, the setting icons 126b, the setting icon 126c, and the setting icon 126d. In this case, as illustrated in FIG. 11, setting is performed such that contrast is high in order of the setting icon 126a, the setting icons 126b, the setting icon 126c, and the setting icon 126d. That is, each of the plurality of setting icons, which are displayed on the setting screen, displayed to be relatively conspicuously in order that the use frequency is high.

According to the fourth embodiment, the image parameters of the plurality of setting icons, which are displayed on the setting screen, are gradually set according to the use frequency. Therefore, it is easy to recognize the setting icons of which the use frequency is high.

Fifth Embodiment

An information processing device 10 according to a fifth embodiment is the same as in the first embodiment other than a fact that information relevant to content of the setting assigned to each of the plurality of setting icons, which are displayed on the setting screen, is displayed. Therefore, content which is different from the first embodiment will be described and duplicated description will not be repeated.

Figure 12:
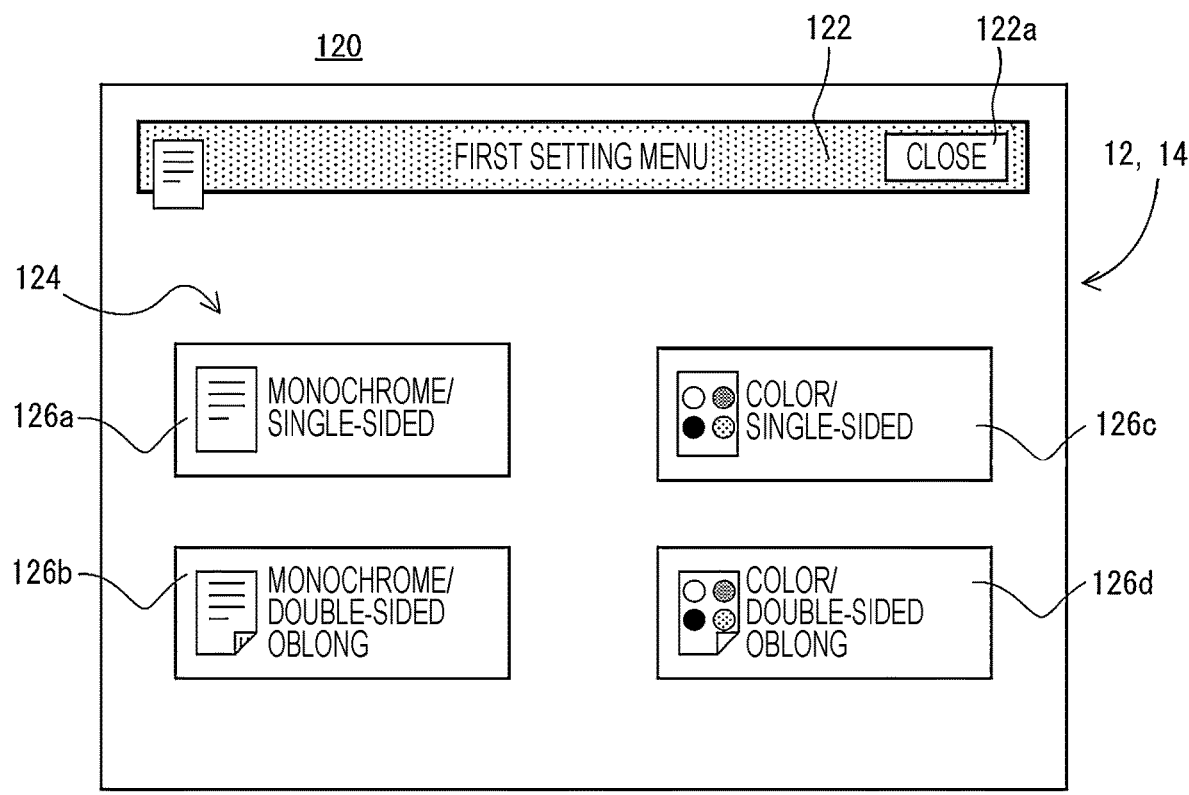
FIG. 12 is a diagram illustrating an example of a first setting screen according to a fifth embodiment.

FIG. 12 is a diagram illustrating an example of the first setting screen 120 according to the fifth embodiment. As illustrated in FIG. 12, in the fifth embodiment, the string or the like relevant to the content of setting assigned to each of the four setting icons 126a to 126d, which are displayed on the first setting screen 120, is displayed. However, instead of the string or together with the string, a figure or the like relevant to the content of the setting assigned to each of the four setting icons 126a to 126d may be displayed.

According to the fifth embodiment, information relevant to the content of setting assigned to each of the plurality of setting icons, which are displayed on the setting screen, is displayed. Therefore, it is easy for the user to recognize settings assigned to the setting icons.

Meanwhile, the detailed configuration or the like, provided in the above-described example, is an example, and an appropriate change is possible according to an actual product.

In addition, in the above-described example, a case where the disclosure is applied to the information processing system 100, which includes the information processing device 10, is described as an example. However, it is possible to apply the disclosure to other apparatuses. For example, it is possible to apply the disclosure to the image forming device 70 which includes respective components included in the above-described information processing device 10 and has the respective functions of the information processing device 10. In this case, it is possible for the image forming device 70 to provide various pieces of information or the predetermined services, which are provided by the above-described information processing device 10, to the user.

Furthermore, in the above-described example, the information processing device 10 includes the display 14 equipped with the touch panel 12, and causes the display 14 to display the setting screen which includes the plurality of setting icons. However, it is not demanded to be limited to the configuration. For example, the image forming device 70 may include the display equipped with the touch panel. In this case, the display 14 equipped with the touch panel 12 in the information processing device 10 may be omitted, or the information processing device 10 may include the display 14 equipped with the touch panel 12 (a configuration in which both the information processing device 10 and the image forming device 70 include the display equipped with the touch panel). However, in a case where the display 14 equipped with the touch panel 12 is omitted in the information processing device 10, a setting screen, in which the plurality of setting icons are included in the display of the image forming device 70, is displayed. In addition, in a case where both the information processing device 10 and the image forming device 70 include the display equipped with the touch panel, a setting screen, in which each of the displays includes the plurality of setting icons, may be displayed or a setting screen, in which any one of the displays includes the plurality of setting icons, may be displayed. In a case where the setting screen, in which the display of the image forming device 70 includes the plurality of setting icons, is displayed, it is possible for the user to determine the first type setting and the second type setting, which are included in the job setting condition, in the setting screen according to the touch input performed on the touch panel of the image forming device 70.

The present disclosure contains subject matter related to that disclosed in Japanese Priority Patent Application JP 2017-211496 filed in the Japan Patent Office on Nov. 1, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming device comprising:
 a display that displays a setting screen which includes a plurality of setting icons to which a first type setting and a second type setting are assigned to be different from each other for the image forming device,
 wherein each of the plurality of setting icons is disposed in a matrix shape, and is disposed such that the first type setting is disposed to be different in a first direction and the second type setting is disposed to be different in a second direction which is different from the first direction, and in each of the plurality of setting icons of the first type setting and the second type setting that are juxtaposed in the first direction, a text and an image related to content of the first type setting or the second type setting are included, the texts in the plurality of setting icons are identical between the first type setting and the second type setting, and the images in the plurality of setting icons are different between the first type setting and the second type setting.

2. The image forming device according to claim 1,
wherein a display aspect according to a use frequency is set to each of the plurality of setting icons.

3. The image forming device according to claim 2,
wherein each of the plurality of setting icons is displayed to be larger in order of high use frequency.

4. The image forming device according to claim 3,
wherein each of the plurality of setting icons has a size in the second direction which is set to a size corresponding to a next setting icon in the first direction, and has a size in the first direction which is set to a size corresponding to a next setting icon in the second direction.

5. The image forming device according to claim 2,
wherein a setting icon, of which the use frequency is low, of the plurality of setting icons is non-displayed.

6. The image forming device according to claim 5,
wherein, in a case where the non-displayed setting icon exists, a display icon, which is used to display the non-displayed setting icon, is provided in the setting screen.

7. The image forming device according to claim 2,
wherein an image parameter according to the use frequency is set to each of the plurality of setting icons.

8. The image forming device according to claim 7,
wherein the image parameter includes at least one of brightness, contrast, or a chroma.

9. An image forming system comprising:
the image forming device according to claim 1; and
an information processing device that is capable of communicating with the image forming device,
wherein at least one of the plurality of functions is performed in such a way that the image forming device cooperates with the information processing device.

* * * * *